US012750743B2

(12) United States Patent
Sirotkin et al.

(10) Patent No.: US 12,750,743 B2
(45) Date of Patent: Sep. 29, 2026

(54) ORBITAL POSITION INFORMATION DELIVERY

(71) Applicant: Apple Inc., Cupertino, CA (US)

(72) Inventors: Alexander Sirotkin, Tel-Aviv (IL); Pavan Nuggehalli, San Carlos, CA (US); Sarma V. Vangala, Campbell, CA (US)

(73) Assignee: Apple Inc., Cupertino, CA (US)

( * ) Notice: Subject to any disclaimer, the term of this patent is extended or adjusted under 35 U.S.C. 154(b) by 682 days.

(21) Appl. No.: 17/878,852

(22) Filed: Aug. 1, 2022

(65) Prior Publication Data

US 2023/0041087 A1 Feb. 9, 2023

Related U.S. Application Data

(60) Provisional application No. 63/229,911, filed on Aug. 5, 2021.

(51) Int. Cl.

*H04W 36/00* (2009.01)
*H04W 36/32* (2009.01)
*H04W 36/36* (2009.01)

(52) U.S. Cl.

CPC . *H04W 36/0058* (2018.08); *H04W 36/00837* (2018.08); *H04W 36/322* (2023.05); *H04W 36/362* (2023.05)

(58) Field of Classification Search

CPC . H04W 84/06; H04W 36/322; H04W 36/362; H04W 36/00; H04W 36/0058; H04W 36/0061; H04W 36/0022; H04W 36/0085; H04W 36/00837; H04W 36/08; H04W 36/0094; H04B 7/18513; H04B 7/18541; H04B 7/185; H04B 7/18517; H04B 7/18504; H04B 7/18508; G01S 19/258

See application file for complete search history.

(56) References Cited

U.S. PATENT DOCUMENTS

2015/0334646 A1* 11/2015 Buckley ................ H04W 48/18 455/432.1
2022/0109496 A1* 4/2022 Shrestha ............ H04B 7/18519
2022/0276394 A1* 9/2022 Niesen ..................... G01S 19/28
2022/0291394 A1* 9/2022 Lee ....................... H04W 48/12
2022/0330187 A1* 10/2022 Cheng ................. H04W 56/004

(Continued)

FOREIGN PATENT DOCUMENTS

CN 111756454 A 10/2020
WO WO-2021066696 A1 * 4/2021 ......... H04B 7/18504
WO 2021147004 A1 7/2021

OTHER PUBLICATIONS

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

(Continued)

*Primary Examiner* — Quoc Thai N Vu

(74) *Attorney, Agent, or Firm* — Kilpatrick Townsend & Stockton LLP

(57) ABSTRACT

The present application relates to devices and components including apparatus, systems, and methods to provide positional information for one or more NTN devices to a UE to be utilized for one or more UE operations.

19 Claims, 11 Drawing Sheets

(56) References Cited

U.S. PATENT DOCUMENTS

| | | | | |
|---|---|---|---|---|
| 2023/0388875 | A1* | 11/2023 | Gao | H04W 36/008357 |
| 2024/0080092 | A1* | 3/2024 | Sedin | H04L 5/0051 |
| 2024/0205874 | A1* | 6/2024 | Xiong | H04W 36/00 |

OTHER PUBLICATIONS

Solutions for NR to support non-terrestrial networks (NTN), Thales, 3GPP TSG RAN Meeting #91-e, RP-210908, Mar. 22-26, 2021, 10 pages.

"Considerations on CHO in NTN", 3rd Generation Partnership Project Technical Specification Group-Radio Access Network Working Group 2 Meeting #107, R2-1910575, Resubmission of R2-1907790; Agenda Item: 11.6.4.1.2; Source: Huawei, HiSilicon; Prague, Czech Republic; Aug. 26-30, 2019 in 2 pages.

"Initial Discussion for Idle and Inactive Mode in NTN", 3rd Generation Partnership Project Technical Specification Group-Radio Access Network Working Group 2 Meeting #111 electronic, R2-2006628, Source: CATT; Agenda Item: 8.10.3.1; Online, Aug. 17-28, 2020 in 6 pages.

"The Consideration of Satellite Ephemeris in NTN", 3rd Generation Partnership Project Technical Specification Group- Radio Access Network Working Group 2 Meeting #112e, R2-2100291, Source: ChinaTelecom; Agenda Item: 8.10.3.2; E-Meeting, Nov. 2-13, 2020 in 2 pages.

Office Action issued in China Application No. CN202210937272.9, dated Jun. 26, 2025 in 10 pages.

Office Action issued in China Application No. CN202210937272.9, dated Dec. 17, 2025 in 17 pages.

First Examination Report issued in India Application No. IN202214044652, dated Dec. 3, 2025 in 6 pages.

* cited by examiner

200

228

| Parameter | Explanation |
|---|---|
| 202 $t_{oe}$ | Ephemerides reference epoch in seconds within the week |
| 204 $\sqrt{a}$ | Square root of semi-major axis |
| 206 $e$ | Eccentricity |
| 208 $M_O$ | Mean anomaly at reference epoch |
| 210 $\omega$ | Argument of perigee |
| 212 $i_O$ | Inclination at reference epoch |
| 214 $\Omega_O$ | Longitude of ascending node at the beginning of the week |
| 216 $\Delta n$ | Mean motion difference |
| 218 $\dot{i}$ | Rate of inclination angle |
| 220 $\dot{\Omega}$ | Rate of node's right ascension |
| 222 $c_{uc}, c_{us}$ | Latitude argument correction |
| 224 $c_{rc}, c_{rs}$ | Orbital radius correction |
| 226 $c_{ic}, c_{is}$ | Inclination correction |

FIG. 2

300

```
-- ASN1START

NavModelSatelliteList ::= SEQUENCE (SIZE(1..64)) OF
NavModelSatelliteElement

NavModelSatelliteElement ::= SEQUENCE {
302  keplerToe        INTEGER (0 .. 16383),
304  keplerW          INTEGER (-2147483648..2147483647),
306  keplerM0         INTEGER (-2147483648..2147483647),
308  keplerE          INTEGER (0..4294967295),
310  keplerAPowerHalf     INTEGER (0.. 4294967295),
312  keplerI0         INTEGER (-2147483648..2147483647),
314  keplerOmega0 INTEGER (-2147483648..2147483647),
     ...
}

-- ASN1STOP
```

FIG. 3

400

| | ***NavModelKeplerianSet* field descriptions** |
|---|---|
| 402 | ***keplerToe***<br>Parameter $t_{oe}$, time-of-ephemeris in seconds.<br>Scale factor 60 seconds. |
| 404 | ***keplerW***<br>Parameter , argument of perigee (semi-circles).<br>Scale factor $2^{-31}$ semi-circles. |
| 406 | ***keplerM0***<br>Parameter M0, mean anomaly at reference time (semi-circles).<br>Scale factor $2^{-31}$ semi-circles. |
| 408 | ***keplerE***<br>Parameter e, eccentricity.<br>Scale factor $2^{-33}$. |
| 410 | ***keplerAPowerHalf***<br>Parameter sqrtA, square root of semi-major Axis in $(\text{metres})^{½}$<br>Scale factor $2^{-19}$ $\text{metres}^{½}$. |
| 412 | ***keplerI0***<br>Parameter i0, inclination angle at reference time (semi-circles).<br>Scale factor $2^{-31}$ semi-circles. |
| 414 | ***keplerOmega0***<br>Parameter OMEGA0, longitude of ascending node of orbit plane at weekly epoch (semi-circles).<br>Scale factor $2^{-31}$ semi-circles. |

FIG. 4

ORBITAL POSITION INFORMATION DELIVERY

CROSS-REFERENCE TO RELATED APPLICATION

This application claims priority to U.S. Provisional Patent Application No. 63/229,911, entitled "ORBITAL POSITION INFORMATION DELIVERY", filed on Aug. 5, 2021, the disclosure of which is incorporated by reference herein in its entirety for all purposes.

BACKGROUND

As wireless networks have developed, the networks have developed to service more areas and more remote areas. An approach that has been proposed for the wireless networks to service more areas and more remote areas is the utilization of non-terrestrial networks. In particular, NTN devices may be utilized within the networks to provide radio access network (RAN) service. The use of the NTN devices within the networks presents many challenges.

BRIEF DESCRIPTION OF THE DRAWINGS

FIG. 2 illustrates example ephemeris information for a NTN device in accordance with some embodiments.

FIG. 3 illustrates an example RRC information element (IE) that may be utilized for transmitting almanac information to a UE in accordance with some embodiments.

FIG. 4 illustrates a table of field descriptions for the RRC IE in accordance with some embodiments.

DETAILED DESCRIPTION

Figure 1:
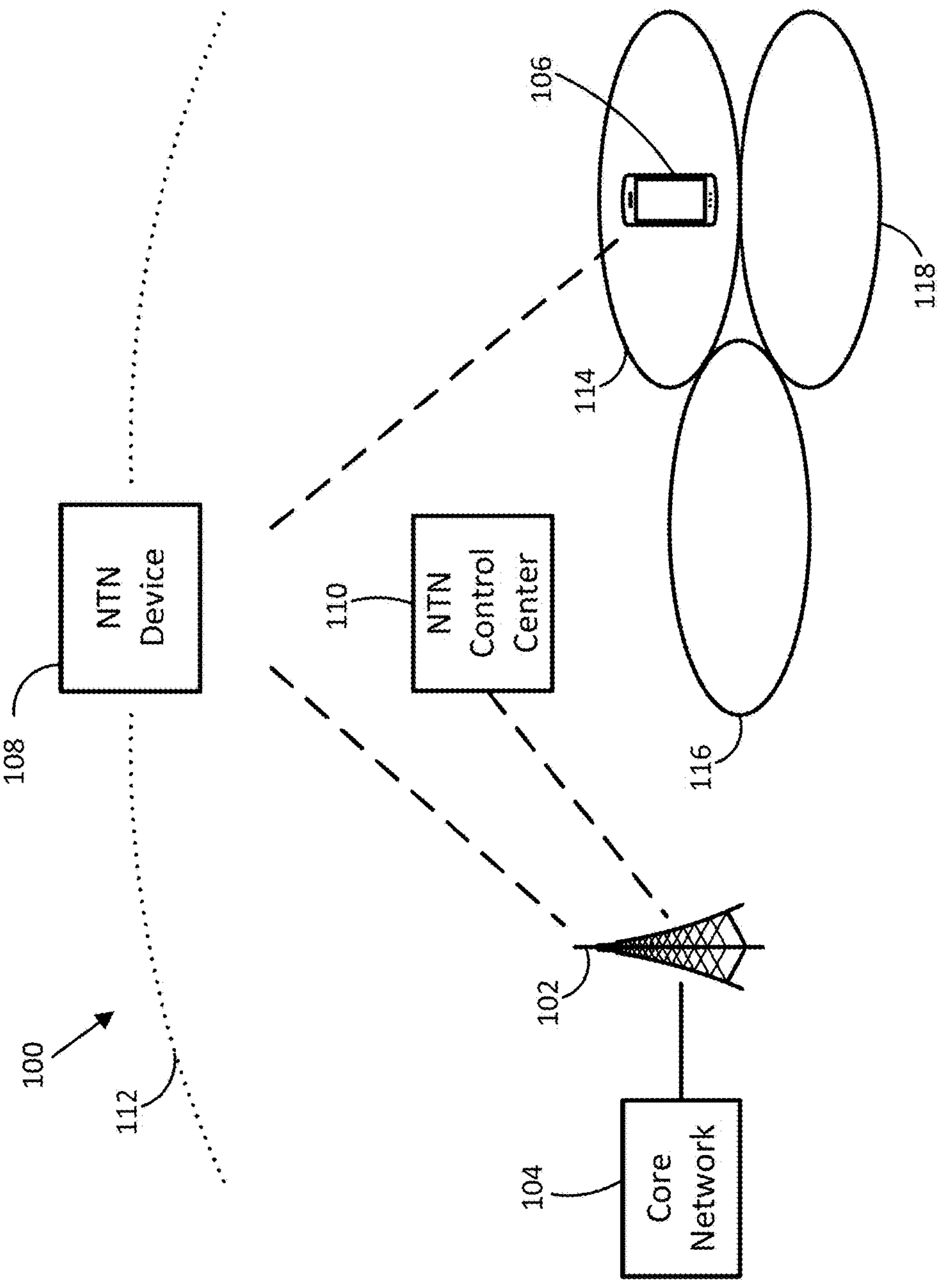
FIG. 1 illustrates an example network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Wireless networks have developed to include non-terrestrial networks (NTNs) for providing wireless area network (WAN) service to user equipments (UEs). As part of a work item for approaches for new radio (NR) to support NTNs, it has been agreed that Satellite/high-altitude pseudo-satellite (HAPS) ephemeris based cell selection and reselection is to be defined for NTN. The term "satellite/HAPS ephemeris" had not been previously defined. The ephemeris may be used at least for cell selection and re-selection, and potentially for conditional handover (CHO), network/satellite type determination, and/or service area timing determination. In addition to the term "satellite/HAPS ephemeris" being fully defined, the procedure to deliver the satellite/HAPS ephemeris information to the UEs has yet to be defined. The approaches described herein include providing almanac information corresponding to one or more NTN devices to UEs. The almanac information may be utilized by the UEs to perform one or more operations, such as cell selection and re-selection, CHO, measurement performance, network/satellite type determination, and/or service area timing determination. Further, RRC message encoding and/or NAS message encoding may be utilized for providing the almanac information to the UEs.

Network Arrangement

FIG. 1 illustrates an example network arrangement 100 in accordance with some embodiments. In particular, the network arrangement 100 illustrates an example NTN that may implement the approaches described herein. The NTN illustrated in the network arrangement 100 is a simplified version illustrating a single representation of each element for clarity and brevity. It should be understood that one or more of each of the elements may be present in embodiments of the network arrangement 100.

The network arrangement 100 may include a base station 102. The base station 102 may, in combination with other components within the network arrangement 100, provide WAN services to UEs. The base station 102 may comprise a nodeB. For example, the base station 102 may comprise a next generation nodeB (gNB) (such as the gNB 1200 (FIG. 12)), an evolved nodeB, or another type of nodeB.

The network arrangement 100 may further include a core network (CN) 104. For example, the CN 104 may comprise a $5^{th}$ Generation Core network (5GC). The CN 104 may be coupled to the base station 102 via a fiber optic or wireless backhaul. The CN 104 may provide functions for the UEs that form a connection with the base station 102, such as subscriber profile information, subscriber location, authentication of services, and/or switching functions for voice and data sessions. In some embodiments, the CN 104 may further be involved in non-access stratum (NAS) messaging of the network arrangement 100.

Figure 11:
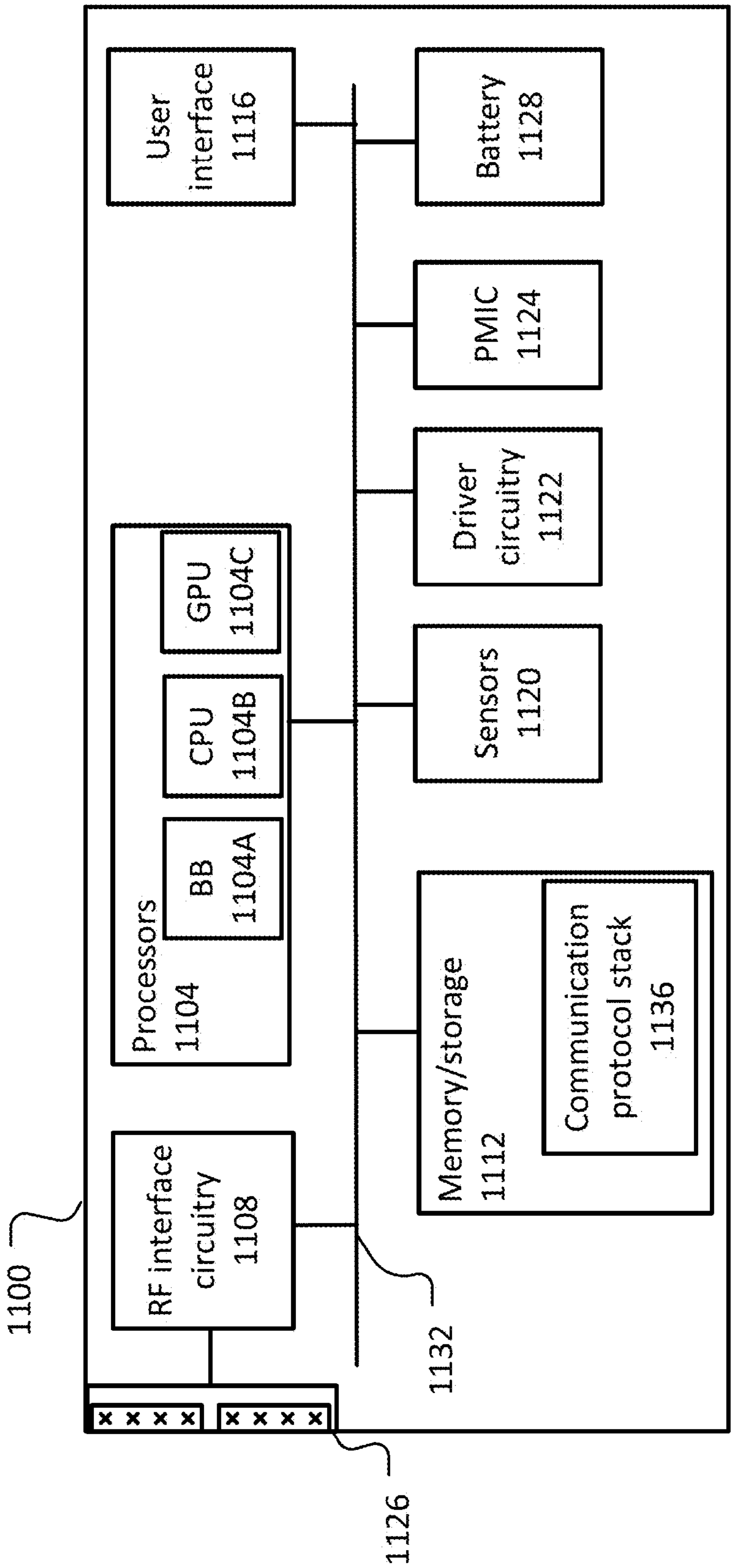
FIG. 11 illustrates an example UE in accordance with some embodiments.

The network arrangement 100 may further include a UE 106. The UE 106 may include one or more of the features of the UE 1100 (FIG. 11). For example, the UE 106 may comprise a phone (such as a smart phone) in some embodiments. The UE 106 may be configured to establish a connection with a WAN and provide services of the WAN to a user of the UE 106. For example, the UE 106 may be configured to establish a wireless connection to a portion of a WAN, such as the base station 102.

The network arrangement 100 may further include an NTN device 108. For example, the NTN device 108 may comprise an earth-fixed satellite (such as a geosynchronous earth orbit satellite or a high-altitude pseudo-satellite (HAPS)), a quasi-earth-fixed satellite (such as a non-geostationary Earth orbit (NGEO) satellite with steerable beam), or an Earth-moving satellite (such as an NGEO with fixed or non-steerable beam). The NTN device 108 may proceed along a course 112 during operation. The NTN device 108 may comprise an NTN device. For example, the NTN device 108 may establish a wireless connection with a base station to provide WAN services to UEs via the NTN device 108. In the illustrated embodiment, the NTN device 108 may provide a connection between the base station 102 and the UE 106. For the NTN device 108 to provide a connection between the base station 102 and the UE 106, information regarding the position and/or the course 112 of the NTN device 108 may be shared with the base station 102 and/or the UE 106 for establishing the connection. In legacy embodiments, there is no agreed definition of satellite ephemeris and no agreed method to deliver the ephemeris (or other information regarding the position and/or the course of the NTN device 108) to a UE.

Networks, such as the network arrangement 100, may support one or more satellite service links. For example, according to agreements, some networks are to support satellite service links of Earth-fixed, quasi-Earth-fixed, and Earth-moving satellite service links. For Earth-fixed satellite service links, provision by beam(s) continuously covering the same geographical areas all the time (for example, the case of GEO satellites and HAPS) may be implemented. For quasi-Earth-fixed satellite service links, provision by beam(s) covering one geographic area for a finite period and a different geographic area during another period (for example, the case of NGEO satellites generating steerable beams) may be implemented. For Earth-moving satellite service links, provision by beam(s) which foot print slides over the Earth surface (for example, the case of NGEO satellites generating fixed or non-steerable beams). Depending on the type of satellite, the satellite coverage Earth footprint for a satellite may be based on direction of beams emitted from the satellite. In other words, satellite coverage Earth footprint may depend not only on the satellite orbital position, but also on the number of beams supported and the onboard antenna diagram. Therefore, even if precise (for example, full Ephemeris) satellite orbital position information is available to a UE, that information cannot always be translated into the precise satellite coverage Earth footprint, which is what the UE may utilize. The NTN device 108 within the network arrangement 100 may implement an Earth-fixed satellite service link, a quasi-Earth-fixed satellite service link, or an Earth-moving satellite service link.

The network arrangement 100 may further include an NTN control center 110, which may be a satellite control center. The NTN control center 110 may store information regarding the position and/or the course of one or more NTN devices within a constellation of NTN devices. A constellation of NTN devices may include NTN devices within a network, such as an NTN. As an example, the NTN control center 110 may store information regarding the position and/or the course of the NTN device 108 in the illustrated embodiment. Base stations may establish a connection with the NTN control center 110 to retrieve the information regarding the position and/or the course of one or more NTN devices within a constellation of NTN devices.

NTN Device Orbital Position Information

FIG. 2 illustrates example ephemeris information 200 for a NTN device in accordance with some embodiments. The NTN control center 110 may store the ephemeris information 200 for each of the NTN devices within the network. For example, the NTN control center 110 may store the ephemeris information 200 for the NTN device 108 in the network arrangement 100. The NTN control center 110 may establish connections with the NTN devices, such as the NTN device 108, to determine the ephemeris information for the NTN devices or may communicate with other devices to retrieve the ephemeris information for the NTN devices. The base station 102 may establish a connection with the NTN control center 110 to retrieve the ephemeris information, or some portion thereof, for one or more of the NTN devices.

The ephemeris information 200 may include NTN device orbital position information, which may also be referred to as orbital position information. The NTN device orbital position information is often divided into a coarse information, referred to as Almanac, and a more precise information, referred to as precise Ephemeris. Generally, the Almanac may provide the information about which NTN devices from a constellation are currently visible. Often times the Almanac for the whole NTN device constellation may be provided (for example, to a UE) and the Almanac may be valid for a few days. The precise Ephemeris may provide a more precise NTN device orbital position information, which can be used, for example, for UE location estimation (for example, for global navigation satellite systems (GNSS)). The precise Ephemeris may be valid for a few hours.

The ephemeris information 200 may include ephemerides reference epoch 202 (which may be indicated in seconds within a week), a square root of semi-major axis 204, an eccentricity 206, a mean anomaly at reference epoch 208, an argument of perigee 210, an inclination at reference epoch 212, a longitude of ascending node 214 (which may be measured at the beginning of the week), a mean motion difference 216, a rate of inclination angle 218, a rate of node's right ascension 220, a latitude argument correction 222, an orbital radius correction 224, an inclination correction 226, or some combination thereof, of a NTN device. In some embodiments, the ephemeris information 200 may comprise all of the elements listed.

The ephemeris information 200 may provide a precise NTN device orbital position information, which may be utilized to determine precise Earth footprint WAN coverage provided by the NTN device in combination with a base station. In terms of being able to define the Earth footprint WAN coverage via the ephemeris information 200, the validity of the Earth footprint WAN coverage indicated may be valid only for a few hours. For example, the ephemeris information 200 may be valid for less than a day.

Due to the precision of the ephemeris information 200 being valid only for a few hours and UEs, such as the UE 106, not requiring that precision for establishing a connection with a base station via an NTN device, a portion of the ephemeris information 200 less than a whole may be adequate for establishing a connection by a UE with a base station via an NTN device. Accordingly, approaches described herein propose providing a portion of the ephemeris information 200 less than the whole to a UE for establishing a connection with a base station via an NTN device. For example, only an almanac may be communicated to a UE, which may reduce the signaling overhead and the UE storage requirements and may be sufficient for UE cell selection and re-selection. By communicating only the almanac to the UE, only signal coarse ephemeris (for example, the almanac in GNSS terminology, may be provided to the UE. The Almanac may be valid for a few days, and it may be feasible to provide the Almanac to the UE for the full NTN device constellation. An almanac 228 may include the ephemerides reference epoch 202, the square root of semi-major axis 204, the eccentricity 206, the mean anomaly at reference epoch 208, the argument of perigee 210, the inclination at reference epoch 212, the longitude of ascending node 214, or some combination thereof. In some embodiments, the almanac 228 may comprise all of the elements listed.

The almanac 228 may comprise a portion of the ephemeris information 200. The almanac 228 may provide more coarse NTN device orbital position information than the ephemeris information 200, which may be utilized to determine coarse Earth footprint WAN coverage provided by the NTN device in combination with a base station. In terms of being able to define the Earth footprint WAN coverage via the almanac 228, the validity of the Earth footprint WAN coverage indicated may be valid for a few days. For example, the information provided by the almanac 228 may be valid for more than a day.

In the illustrated embodiment of the network arrangement 100, the base station 102 may establish a connection with the NTN control center 110. The base station 102 may utilize the connection to retrieve the ephemeris information 200 and/or the almanac 228 for the NTN device 108. The base station 102 may provide, such as via the NTN device 108, the almanac 228 to the UE 106.

The UE 106 may utilize the information from the almanac 228 to determine positional information for the NTN device 108. The positional information determined may include an Earth footprint WAN coverage of the NTN device 108 in combination with the base station 102. The UE 106 may utilize one or more equations well known in the field with the information from the almanac 228 to identify a position of the NTN device 108 and/or the Earth footprint WAN coverage of the NTN device 108. The Earth footprint WAN coverage of the NTN device 108 may define an area for which the NTN device 108 in combination with the base station 102 may provide WAN service. In some embodiments, the Earth footprint WAN coverage may be divided into multiple cells such as a first cell 114, second cell 116, and third cell 118 in some embodiments. In some embodiments, the base station 102 may provide, such as via the NTN device 108, cell identifiers (IDs) for the cells and/or frequencies at which the cells operate along with the information from the almanac 228. Based on the position of the NTN device 108 and/or the Earth footprint WAN coverage of the NTN device 108, the UE 106 may determine whether the UE 106 can establish a connection with the base station 102 via the NTN device 108 and, if the UE 106 determines that a connection can be established, the UE 106 may establish connection with the base station 102. Further, the UE 106 may utilize information related to the cells (such as location of the cells) to select a cell for the connection and/or perform a handover (such as a conditional handover (CHO)) to another cell for the connection with the base station 102 via the NTN device 108.

Signaling

The base station 102 may implement two alternative embodiments for signaling of the almanac 228, dedicated radio resource control (RRC) and non-access stratum (NAS). For example, the base station 102 may transmit the information from the almanac 228 in an RRC message or the CN 104 may transmit the almanac 228 in a NAS message. The base station 102 may generate the RRC message and may transmit the RRC message to the UE 106. The CN 104 may generate the NAS message and the CN 104 may transmit the NAS message through the base station over the air interface to the UE 106. Transmission of the almanac information from the almanac may be available in the RRC message or the NAS message due to the size of the almanac information being smaller than the size of the ephemeris information 200.

In some embodiments, the base station 102 may transmit the almanac information from the almanac 228 in an RRC reconfiguration message. Using the dedicated RRC signaling may provide for ease of transfer of the almanac information (or the ephemeris information in some embodiments) from the NTN control center 110 to the base station 102 due to the NTN control center 110 being connected to the base station 102. For example, an advantage of the dedicated RRC signaling may be that the NTN device orbital position information is typically calculated by the NTN control center, which is expected to be connected to next generation radio access network (NG-RAN), and therefore it would be easier to get the information in the base station (such as a gNB) to be delivered to the UE via RRC, rather than to the CN (such as a 5GC) to be delivered via NAS.

FIG. 3 illustrates an example RRC information element (IE) 300 that may be utilized for transmitting almanac information to a UE in accordance with some embodiments. FIG. 4 illustrates a table 400 of field descriptions for the RRC IE 300 in accordance with some embodiments. The RRC IE 300 may carry almanac information for one or more NTN devices (such as the NTN device 108 (FIG. 1)). In some embodiments, the RRC IE 300 may be transmitted in an RRC reconfiguration message from a base station (such as the base station 102 (FIG. 1)) to a UE (such as the UE 106 (FIG. 1)). For the case of the dedicated RRC message embodiment, the NTN device orbital position information can be encoded as shown in FIG. 3.

The RRC IE 300 may include information corresponding to the almanac 228 (FIG. 2). For example, the RRC IE 300 may include a time-of-ephemeris parameter 302, as indicated by keplerToe. The time-of-ephemeris parameter 302 may include time-of-ephemeris in seconds for each of the one or more NTN devices included in the RRC IE 300, as indicated by time-of-ephemeris field description 402 in the table 400. For example, the time-of-ephemeris parameter 302 may include the ephemerides reference epoch 202 (FIG. 2) for each of the NTN devices. In some embodiments, a scale factor for the time-of-ephemeris parameter 302 may be set to 60 seconds.

The RRC IE 300 may further include an argument of perigee parameter 304, as indicated by keplerW. The argument of perigee parameter 304 may include the argument of perigee as measured in semi-circles for each of the one or more NTN devices included in the RRC IE 300, as indicated by the argument of perigee field description 404 in the table 400. For example, the argument of perigee parameter 304 may include argument of perigee 210 (FIG. 2) for each of the NTN devices. In some embodiments, a scale factor for the argument of perigee parameter 304 may be set to $2^{-31}$ semi-circles.

The RRC IE 300 may further include a mean anomaly parameter 306, as indicated by keplerM0. The mean anomaly parameter 306 may include a mean anomaly at reference time as measured in semi-circles for each of the one or more NTN devices included in the RRC IE 300, as indicated by the mean anomaly field description 406 in the table 400. For example, the mean anomaly parameter 306 may include the mean anomaly at reference epoch 208 (FIG. 2) for each of the NTN devices. In some embodiments, a scale factor for the mean anomaly parameter 306 may be set to $2^{-31}$ semi-circles.

The RRC IE 300 may further include an OMEGAdot parameter 308, as indicated by keplerOmegaDot. The OMEGAdot parameter 308 may include a rate of change of right ascension as measured in semi-circles for each of the one or more NTN devices included in the RRC IE 300, as indicated by the OMEGAdot field description 408 in the table 400. For example, the OMEGAdot parameter 308 may include the rate of node's right ascension 220 (FIG. 2) for each of the NTN devices. In some embodiments, a scale factor for the OMEGAdot parameter 308 may be set to $2^{-43}$ semi-circles/second.

The RRC IE 300 may further include an eccentricity parameter 310, as indicated by keplerE. The eccentricity parameter 310 may include an eccentricity indication for each of the one or more NTN devices included in the RRC IE 300, as indicated by the eccentricity field description 410 in the table 400. For example, the eccentricity parameter 310 may include eccentricity 206 (FIG. 2) for each of the NTN devices. In some embodiments, a scale factor for the eccentricity parameter 310 may be set to $2^{-33}$.

The RRC IE 300 may further include a square root of semi-major Axis parameter 312, as indicated by keplerAPowerHalf. The square root of semi-major Axis parameter 312 may include a square root of semi-major Axis as measured in $(\text{metres})^{1/2}$ for each of the one or more NTN devices included in the RRC IE 300, as indicated by the square root of semi-major Axis parameter field description 412 in the table 400. For example, the square root of semi-major Axis parameter 312 may include the square root of semi-major axis 204 (FIG. 2) for each of the NTN devices. In some embodiments, a scale factor for the square root of semi-major Axis parameter 312 may be set to $2^{-19}$ $(\text{metres})^{1/2}$.

The RRC IE 300 may further include an inclination angle parameter 314, as indicated by keplerI0. The inclination angle parameter 314 may include an inclination angle at reference time as measured in semi-circles for each of the one or more NTN devices included in the RRC IE 300, as indicated by the inclination angle field description 414 in the table 400. For example, the inclination angle parameter 314 may include the inclination at reference epoch 212 (FIG. 2) for each of the NTN devices. In some embodiments, a scale factor of the inclination angle parameter 314 may be set to $2^{-31}$ semi-circles.

The RRC IE 300 may further include an OMEGA0 parameter 316, as indicated by keplerOmega0. The OMEGA0 parameter 316 may include a longitude of ascending node of orbit plane at weekly epoch as measured in semi-circles for each of the one or more NTN devices included in the RRC IE 300, as indicated by the OMEGA0 field description 416 in the table 400. For example, the OMEGA0 parameter 316 may include the longitude of ascending node 214 (FIG. 2) for each of the NTN devices. In some embodiments, a scale factor for the OMEGA0 parameter 316 may be set to $2^{-31}$ semi-circles.

Referring to the network arrangement 100 (FIG. 1), in embodiments where dedicated RRC signaling is being utilized, the base station 102 (FIG. 1) may transmit an RRC reconfiguration message to the UE 106 (FIG. 1) that includes the RRC IE 300. Accordingly, the base station 102 may provide the almanac information from the almanac 228 (FIG. 2) to the UE 106 in the RRC reconfiguration message. In some embodiments, the RRC reconfiguration message may further include cell IDs and/or indications of frequencies implemented by cells within the network arrangement 100. In particular, the base station 102 may retrieve the information for the RRC IE 300 from the NTN control center 110 (FIG. 1). The base station 102 may generate the RRC reconfiguration message with the RRC IE 300. The base station 102 may then transmit the RRC reconfiguration message to the UE 106 (such as via the NTN device 108 (FIG. 1)).

The UE 106 may determine positional information (such as locations of one or more NTN devices and/or satellite coverage Earth footprint of one or more NTN devices) related to the RAN service from the RRC reconfiguration message and may utilize the information to perform cell selection, perform CHO, and/or determine which cells and/or frequencies on which to perform measurements. For example, the UE 106 may determine positional information for the one or more NTN devices, which may include the locations of the one or more NTN devices and/or the satellite coverage Earth footprint of the one or more NTN devices. In some instances, the UE may establish a connection with a cell (such as the first cell 114 (FIG. 1)) via a NTN device of the one or more NTN devices based on the positional information. In some instances, the UE may determine cells and/or frequencies that are unavailable to the UE based on the positional information. When performing measurements of network elements, the UE may exclude measurement of the cells and/or frequencies that are unavailable to the UE.

In other embodiments, the base station 102 may transmit the almanac information from the almanac 228 in a configuration update command of the NAS signaling. In some embodiments, the almanac information for a plurality of NTN devices (such as a whole NTN device constellation) to be transmitted to a UE may be large and may require segmentation for transmission to the UE. NAS signaling may address the segmentation better than RRC signaling, which may make NAS signaling preferred in this instance. For example, the information (even just the Almanac) for the whole NTN device constellation can be large and may require segmentation, which makes the NAS alternative more attractive.

Figure 5:
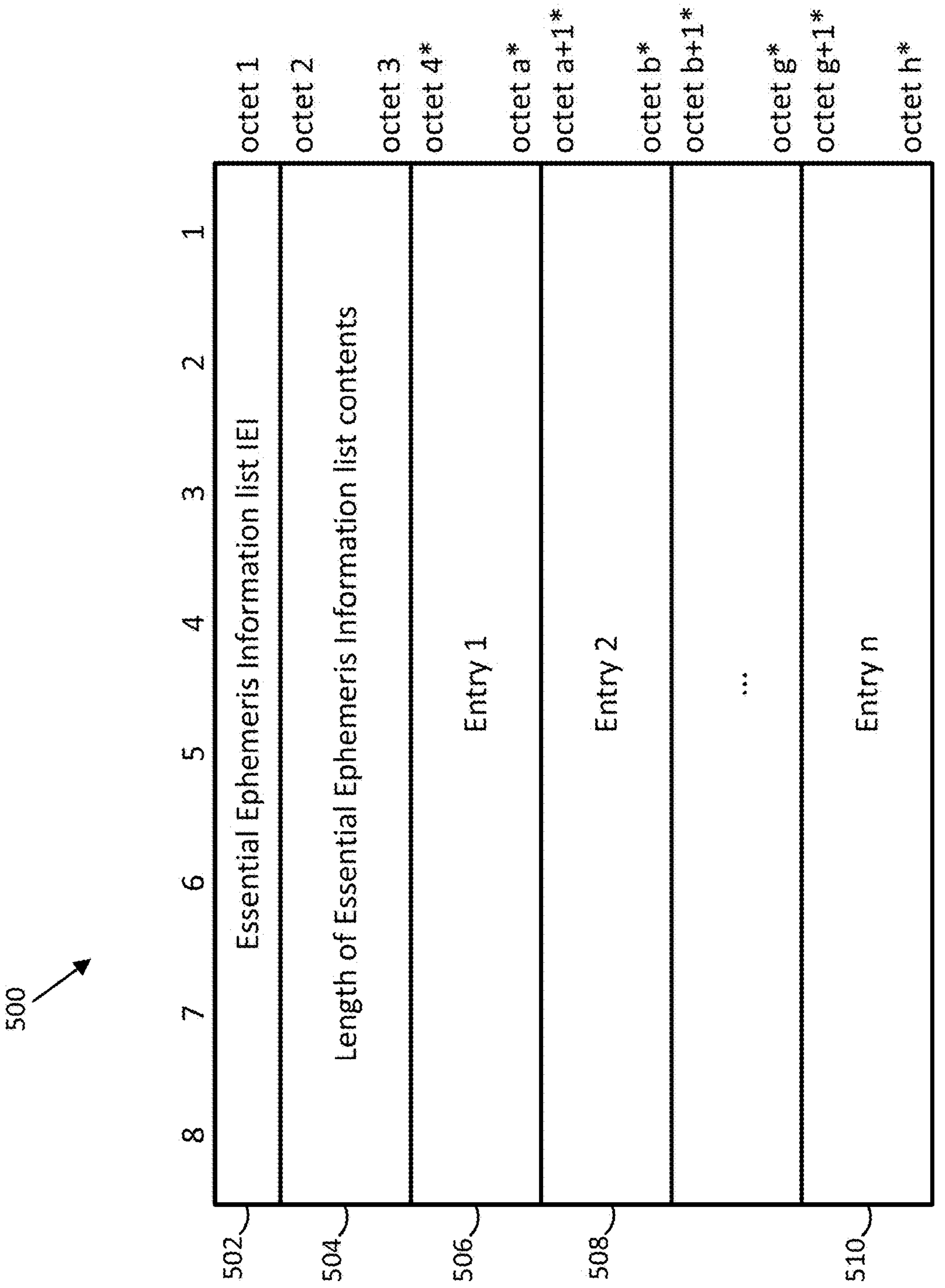
FIG. 5 illustrates an example essential ephemeris information list for NAS signaling in accordance with some embodiments.
Figure 6:
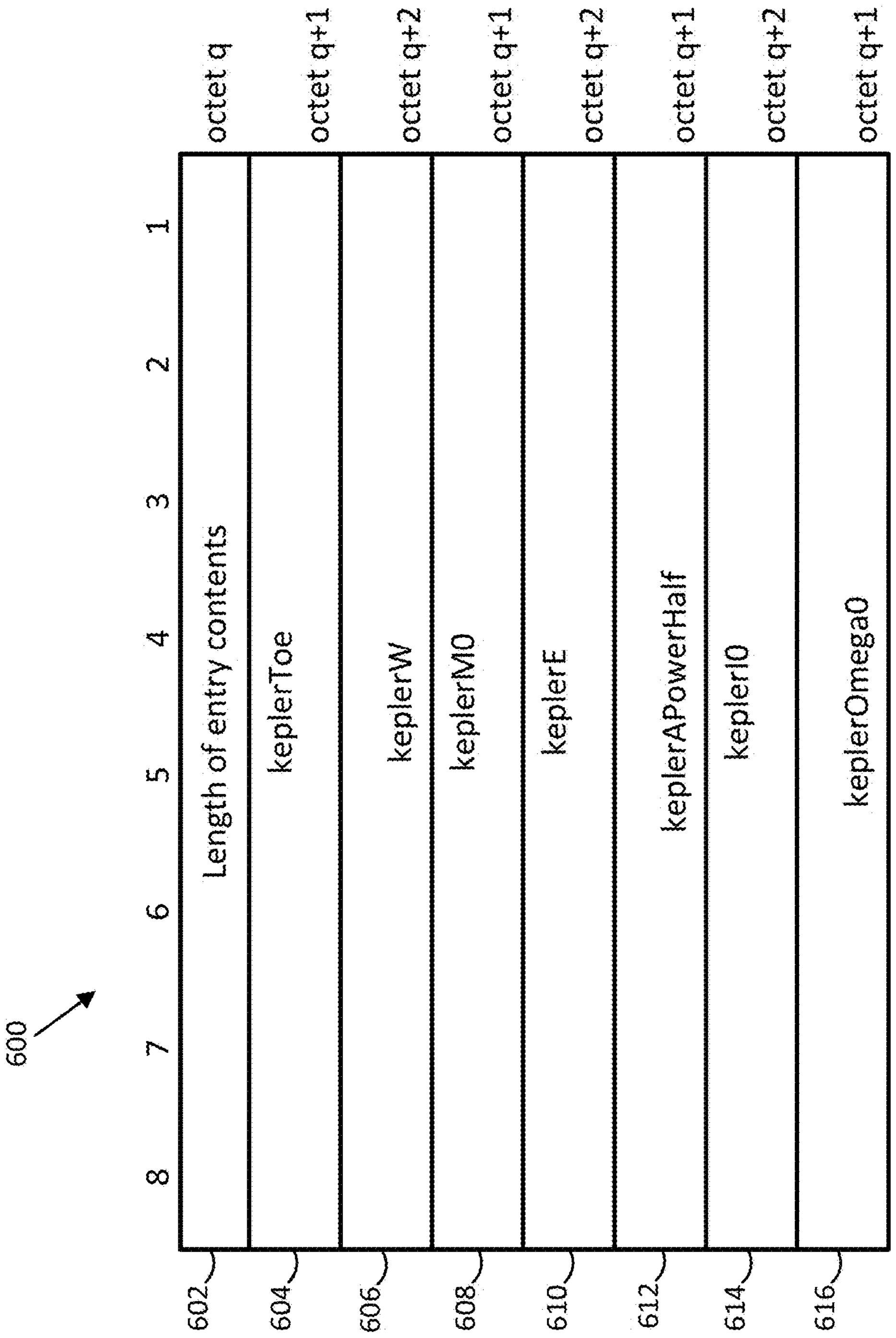
FIG. 6 illustrates an example essential ephemeris information entry that may be included in the essential ephemeris information list in accordance with some embodiments.

FIG. 5 illustrates an example essential ephemeris information list 500 for NAS signaling in accordance with some embodiments. FIG. 6 illustrates an example essential ephemeris information entry 600 that may be included in the essential ephemeris information list 500 in accordance with some embodiments. In some embodiments, the essential ephemeris information list 500 may be transmitted in a configuration update command of NAS signaling from a CN (such the CN 104) through a base station (such as the base station 102 (FIG. 1)) to a UE (such as the UE 106 (FIG. 1)). For the case of the NAS message embodiments, the NTN device orbital position information can be encoded as shown in FIG. 5 and FIG. 6.

The essential ephemeris information list 500 may include an essential ephemeris information list information element indicator (IEI) 502. The essential ephemeris information list IEI 502 may indicate information included within the essential ephemeris information list 500. The essential ephemeris information list 500 may further include a length of essential ephemeris information list contents 504. The length of essential ephemeris information list contents 504 may indicate a number of entries within the essential ephemeris information list 500. The essential ephemeris information list 500 may further include one or more entries. For example, the essential ephemeris information list 500 is illustrated with a first entry 506, a second entry 508, and an $n^{th}$ entry 510 in the illustrated embodiment. Each of the entries may include the features of the essential ephemeris information entry 600. Each entry may correspond to a NTN device, where each NTN device for which information is being provided in the essential ephemeris information list 500 has a corresponding entry.

The essential ephemeris information entry 600 may include a length of entry contents parameter 602. The length of entry contents parameter 602 may indicate a number of parameters within the essential ephemeris information entry 600.

The essential ephemeris information entry 600 may further include information corresponding to the almanac 228 (FIG. 2). For example, the essential ephemeris information entry 600 may include a time-of-ephemeris parameter 604, as indicated by keplerToe. The time-of-ephemeris parameter 604 may include time-of-ephemeris in seconds for a NTN device corresponding to the essential ephemeris information entry 600. For example, the time-of-ephemeris parameter 604 may include the ephemerides reference epoch 202 (FIG. 2) for the NTN device. In some embodiments, a scale factor for the time-of-ephemeris parameter 604 may be set to 60 seconds.

The essential ephemeris information entry 600 may further include an argument of perigee parameter 606, as indicated by keplerW. The argument of perigee parameter 606 may include the argument of perigee as measured in semi-circles for the NTN device corresponding to the essential ephemeris information entry 600. For example, the argument of perigee parameter 606 may include argument of perigee 210 (FIG. 2) for the NTN device. In some embodiments, a scale factor for the argument of perigee parameter 606 may be set to $2^{-31}$ semi-circles.

The essential ephemeris information entry 600 may further include a mean anomaly parameter 608, as indicated by keplerM0. The mean anomaly parameter 608 may include a mean anomaly at reference time as measured in semi-circles for the NTN device corresponding to the essential ephemeris information entry 600. For example, the mean anomaly parameter 608 may include the mean anomaly at reference epoch 208 (FIG. 2) for the NTN device. In some embodiments, a scale factor for the mean anomaly parameter 608 may be set to $2^{-31}$ semi-circles.

The essential ephemeris information entry 600 may further include an eccentricity parameter 610, as indicated by keplerE. The eccentricity parameter 610 may include an eccentricity indication for the NTN device corresponding to the essential ephemeris information entry 600. For example, the eccentricity parameter 610 may include eccentricity 206 (FIG. 2) for the NTN device. In some embodiments, a scale factor for the eccentricity parameter 610 may be set to $2^{-33}$.

The essential ephemeris information entry 600 may further include a square root of semi-major Axis parameter 612, as indicated by keplerAPowerHalf. The square root of semi-major Axis parameter 612 may include a square root of semi-major Axis as measured in $(\text{metres})^{1/2}$ for the NTN device corresponding to the essential ephemeris information entry 600. For example, the square root of semi-major Axis parameter 612 may include the square root of semi-major axis 204 (FIG. 2) for the NTN device. In some embodiments, a scale factor for the square root of semi-major Axis parameter 612 may be set to $2^{-19}$ $(\text{metres})^{1/2}$.

The essential ephemeris information entry 600 may further include an inclination angle parameter 614, as indicated by keplerI0. The inclination angle parameter 614 may include an inclination angle at reference time as measured in semi-circles for the NTN device corresponding to the essential ephemeris information entry 600. For example, the inclination angle parameter 614 may include the inclination at reference epoch 212 (FIG. 2) for the NTN device. In some embodiments, a scale factor of the inclination angle parameter 614 may be set to $2^{-31}$ semi-circles.

The essential ephemeris information entry 600 may further include an OMEGA0 parameter 616, as indicated by keplerOmega0. The OMEGA0 parameter 616 may include a longitude of ascending node of orbit plane at weekly epoch as measured in semi-circles for each of the NTN device corresponding to the essential ephemeris information entry 600. For example, the OMEGA0 parameter 616 may include the longitude of ascending node 214 (FIG. 2) for each of the NTN devices. In some embodiments, a scale factor for the OMEGA0 parameter 616 may be set to $2^{-31}$ semi-circles.

Referring to the network arrangement 100 (FIG. 1), in embodiments whether NAS signaling is being utilized, the base station may transmit a configuration update command to the UE 106 (FIG. 1) that includes the essential ephemeris information list 500. Accordingly, the base station 102 may provide the almanac information from the almanac 228 (FIG. 2) to the UE 106 in the configuration update command. In some embodiments, the configuration update command may further include cell IDs and/or indications of frequencies implemented by cells within the network arrangement 100.

The base station 102 may retrieve the information for the essential ephemeris information list 500 from the NTN control center 110 (FIG. 1). The base station 102 may then provide the information for the essential ephemeris information list 500 to the CN 104 (FIG. 1) for generation of the configuration update command. The CN 104 may generate the configuration update command with the essential ephemeris information list 500, where the essential ephemeris information list may include one or more entries for NTN devices within the network arrangement 100, such as the NTN device 108 (FIG. 1). The CN 104 may provide the configuration update command to the base station 102 for transmission to the UE 106. The base station 102 may then transmit the configuration update command to the UE (such as via the NTN device 108).

The UE 106 may determine positional information (such as locations of one or more NTN devices and/or satellite coverage Earth footprint of one or more NTN devices) related to the RAN service from the configuration update command and may utilize the information to perform cell selection, perform CHO, and/or determine which cells and/or frequencies on which to perform measurements. For example, the UE 106 may determine positional information for the one or more NTN devices, which may include the locations of the one or more NTN devices and/or the satellite coverage Earth footprint of the one or more NTN devices. In some instances, the UE may establish a connection with a cell (such as the first cell 114 (FIG. 1)) via a NTN device of the one or more NTN devices based on the positional information. In some instances, the UE may determine cells and/or frequencies that are unavailable to the UE based on the positional information. When performing measurements of network elements, the UE may exclude measurement of the cells and/or frequencies that are unavailable to the UE.

Figure 7:
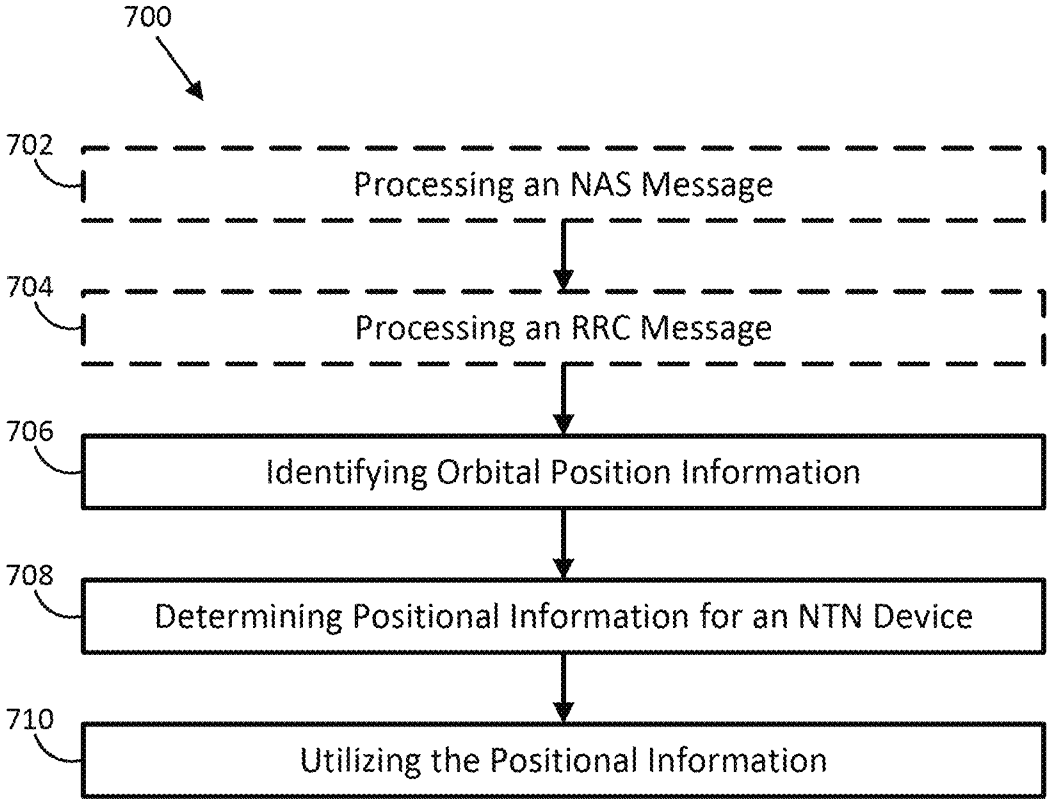
FIG. 7 illustrates an example procedure for utilizing an almanac portion of ephemeris information to perform operations in accordance with some embodiments.

FIG. 7 illustrates an example procedure 700 for utilizing an almanac portion of ephemeris information to perform operations in accordance with some embodiments. The procedure 700 may be performed by a UE, such as the UE 106 (FIG. 1) and/or the UE 1100 (FIG. 11).

The procedure 700 may include processing a NAS message in 702. In particular, the UE may process a NAS message received from a base station to identify orbital position information. The NAS message may comprise the configuration update command as described throughout this disclosure. The NAS message may include the almanac information. Processing of the NAS message may include extracting the almanac information from the NAS message. In some embodiments, 702 may be omitted.

The procedure 700 may include processing an RRC message in 704. In particular, the UE may process an RRC message received from a base station to identify orbital position information. The RRC message may comprise the RRC reconfiguration message as described throughout this disclosure. The RRC message may include the almanac information. Processing of the RRC message may include extracting the almanac information from the RRC message. In some embodiments, 704 may be omitted.

The procedure 700 may include identifying orbital position information in 706. In particular, the UE may identify orbital position information for one or more NTN devices (such as the NTN device 108 (FIG. 1)) that are to provide RAN service. The orbital position information may be restricted to an almanac portion of ephemeris information for the one or more NTN devices. For example, identifying the orbital information may include identifying the almanac information extracted from the NAS message or the RRC message in some embodiments, where the almanac information is the almanac portion of the ephemeris information. The almanac portion of the ephemeris information may comprise the almanac information from the almanac 228 (FIG. 2). For example, the almanac portion of the ephemeris information may include ephemerides reference epochs, square roots of semi-major axes, eccentricities, mean anomalies at reference epoch, arguments of perigees, inclinations at reference epochs, longitudes of ascending nodes at a beginning of a week, or some combination thereof for each of the one or more NTN devices. In some embodiments, the almanac portion of the ephemeris information may include information that has a validity period of greater than one day. In some embodiments, the orbital position information may further include cell IDs and/or indications of frequencies implemented by cells corresponding to the almanac portion of the ephemeris information.

The procedure 700 may include determining positional information for a NTN device in 708. In particular, the UE may determine positional information a NTN device of the one or more NTN devices based on the orbital position information identified in 706. In some embodiments, the UE may determine positional information for each of the NTN devices in the one or more NTN devices, or may determine positional information for a portion of the one or more NTN devices. The positional information may include a location of the NTN device or a satellite coverage Earth footprint of the NTN device. The UE may utilize the orbital position information and equations that are well known in the art for determining the positional information, such as the location of the NTN device or the satellite coverage Earth footprint of the NTN device. In some embodiments, determining the positional information may include determining cell information and/or frequency information associated with the NTN device based on the orbital position information. For example, the UE may determine the cell information and/or the frequency information based on the cell IDs and/or the indications of frequencies included in the orbital position information in some embodiments.

The procedure 700 may include utilizing the positional information for UE operations in 710. For example, the UE may utilize the positional information for the NTN device for cell selection, CHO, and/or measurement acquisition by the UE. In some embodiments, utilizing the positional information may include establishing a connection with a cell via the NTN device based on the positional information. For example, the UE may establish a connection with a cell via the NTN device that may be identified based on the positional information. In some embodiments, utilizing the positional information may include determining cells or frequencies that are unavailable to the UE based on the positional information. The UE may perform measurements of a portion of the cells and/or frequencies determined based on the positional information, where the portion of cells and/or frequencies measured may exclude the cells and/or frequencies that are unavailable to the UE.

Figure 8:
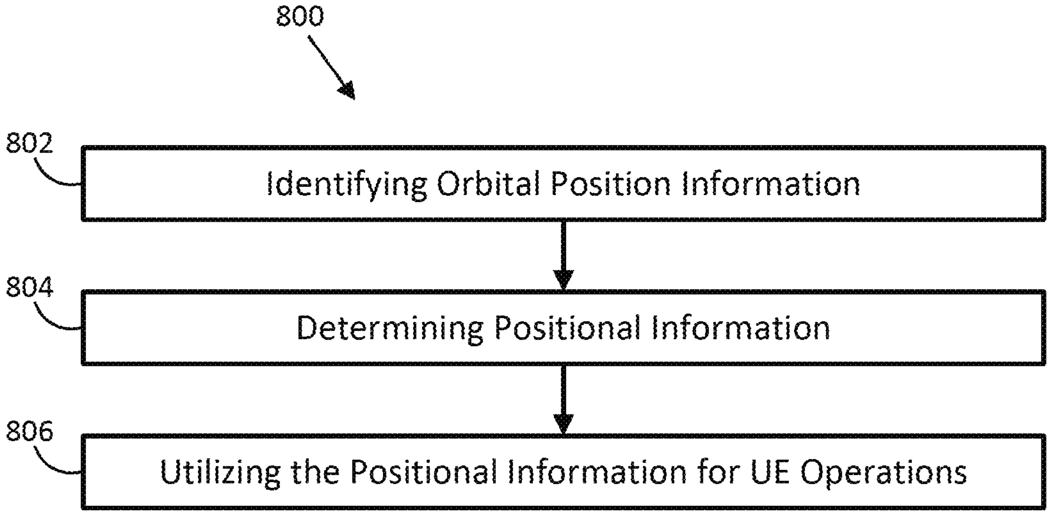
FIG. 8 illustrates an example procedure for performing a UE operation based on orbital position information in accordance with some embodiments.

FIG. 8 illustrates an example procedure 800 for performing a UE operation based on orbital position information in accordance with some embodiments. The procedure 800 may be performed by a UE, such as the UE 106 (FIG. 1) and/or the UE 1100 (FIG. 11).

The procedure 800 may include identifying orbital position information in 802. In particular, the UE may identify orbital position information for one or more NTN devices (such as the NTN device 108 (FIG. 1)) received in an RRC message or a NAS message from a base station (such as the base station 102 (FIG. 1)). In some embodiments, the RRC message may comprise an RRC reconfiguration message (such as the RRC reconfiguration messages described throughout this disclosure), where identifying the orbital position information may include identifying the orbital position information included in the RRC reconfiguration message. In some embodiments, the NAS message may comprise a configuration update command (such as the configuration update commands described throughout this disclosure), where identifying the orbital position information may include identifying the orbital position information included in the NAS message. The RRC message and/or the NAS message may be routed from the base station through a NTN device (such as the NTN device 108 (FIG. 1)) of one or more NTN devices to the UE.

The orbital position information received in the RRC message or the NAS message may include the almanac portion of ephemeris information for the one or more NTN devices. The almanac portion of the ephemeris information may comprise the almanac information from the almanac 228 (FIG. 2). For example, the almanac portion may comprise ephemerides reference epochs, square roots of semi-major axes, eccentricities, mean anomalies at reference epochs, arguments of perigees, inclinations at reference epochs, longitudes of ascending nodes, or some combination thereof for each of the one or more NTN devices. In some embodiments, the almanac portion of the ephemeris information may include information that has a validity period of greater than one day. In some embodiments, the orbital position information may further include cell IDs and/or indications of frequencies implemented by cells corresponding to the almanac portion of the ephemeris information.

The procedure 800 may include determining positional information for a NTN device in 804. In particular, the UE may determine positional information for a NTN device of the one or more NTN devices based on the orbital position information identified in 802. In some embodiments, the UE may determine positional information for each of the NTN devices in the one or more NTN devices, or may determine positional information for a portion of the one or more NTN devices. The positional information may include a location of the NTN device or a satellite coverage Earth footprint of the NTN device. The UE may utilize the orbital position information and equations that are well known in the art for determining the positional information, such as the location of the NTN device or the satellite coverage Earth footprint of the NTN device. In some embodiments, determining the positional information may include determining cell information and/or frequency information associated with the NTN device based on the orbital position information. For example, the UE may determine the cell information and/or the frequency information based on the cell IDs and/or the indications of frequencies included in the orbital position information in some embodiments.

The procedure 800 may include utilizing the positional information for UE operations. For example, the UE may utilize the positional information for one or more UE operations, such as cell selection, CHO, and/or measurement acquisition by the UE. In some embodiments, utilizing the positional information may include establishing a connection with a cell via the NTN device based on the positional information. For example, the UE may establish a connection with a cell via the NTN device that may be identified based on the positional information. In some embodiments, utilizing the positional information may include determining cells or frequencies that are unavailable to the UE based on the positional information. The UE may perform measurements of a portion of the cells and/or frequencies determined based on the positional information, where the portion of cells and/or frequencies measured may exclude the cells and/or frequencies that are unavailable to the UE.

Figure 9:
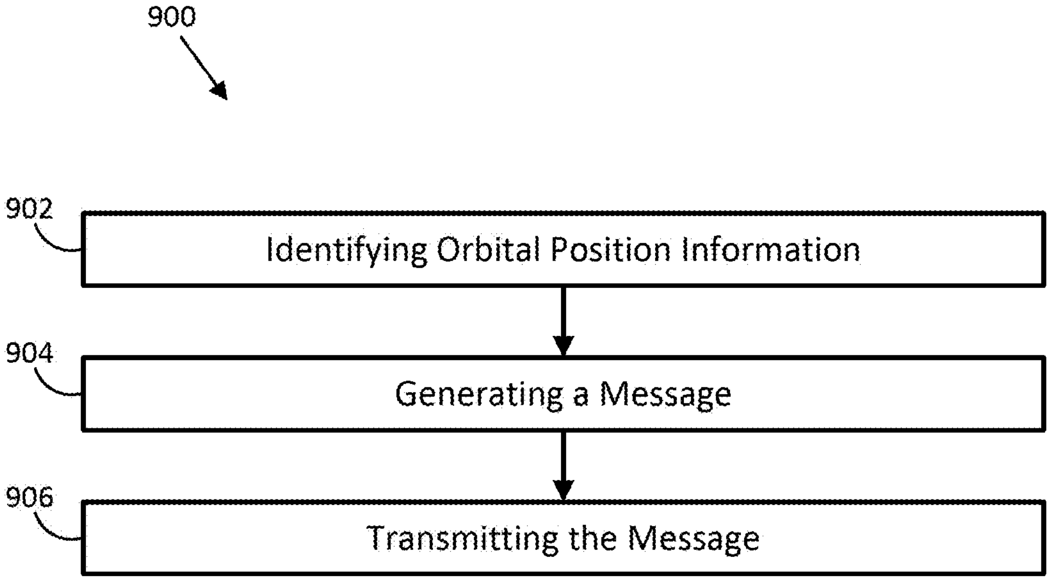
FIG. 9 illustrates a procedure for providing orbital information to a UE in accordance with some embodiments.
Figure 12:
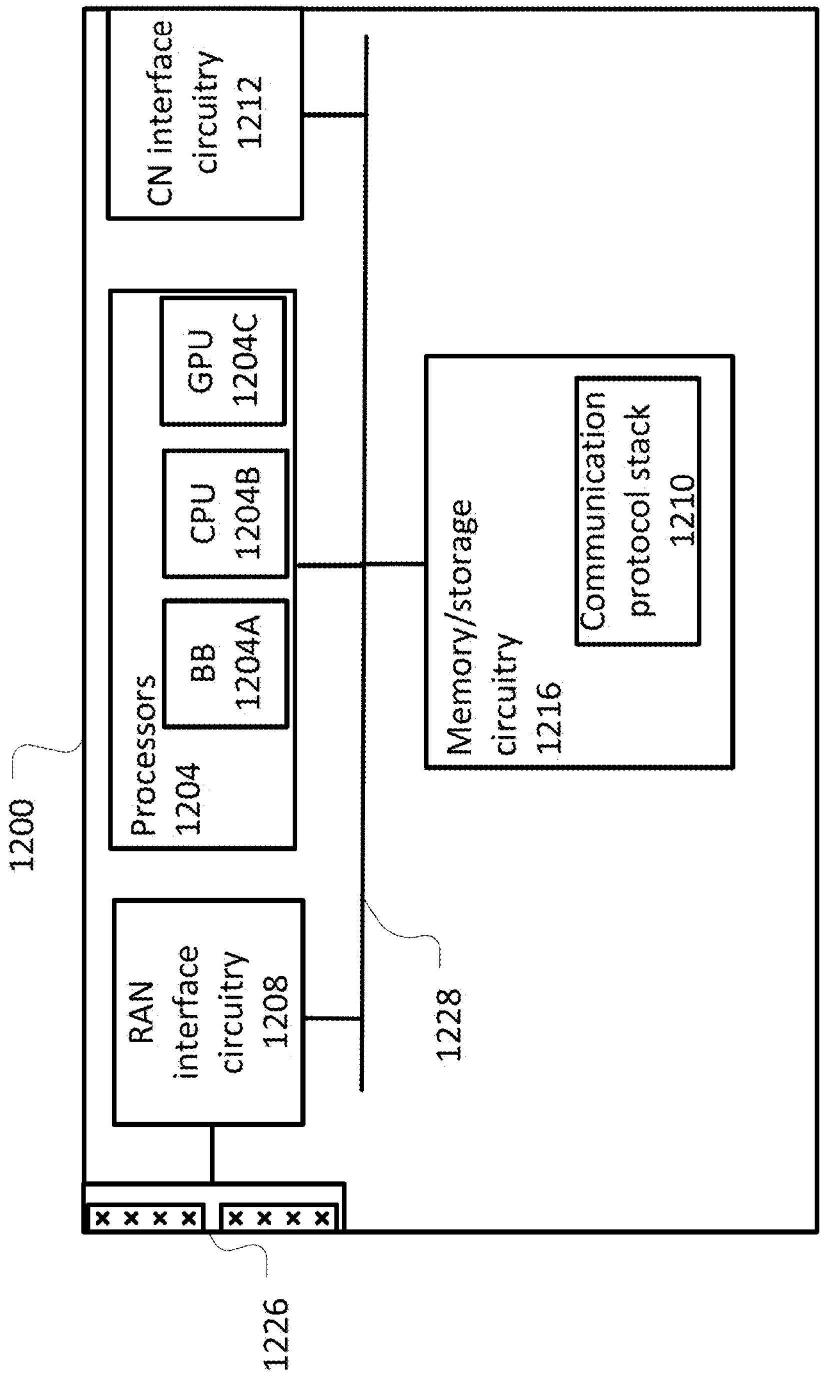
FIG. 12 illustrates an example gNB in accordance with some embodiments.

FIG. 9 illustrates a procedure 900 for providing orbital information to a UE in accordance with some embodiments. The procedure 900 may be performed by a base station, such as the base station 102 (FIG. 1) and/or the gNB 1200 (FIG. 12).

The procedure 900 may include identifying orbital position information. In particular, the base station may identify orbital position information for one or more NTN devices (such as the NTN device 108 (FIG. 1)) for serving UEs obtained from a NTN control center (such as the NTN control center 110 (FIG. 1)). The orbital position information may be a portion of ephemeris information (such as the ephemeris information 200 (FIG. 2)) less than a whole of the ephemeris information for the one or more NTN devices. In some embodiments, the portion of the ephemeris information may include an almanac portion of the ephemeris information, where the almanac information includes the almanac information of the almanac 228 (FIG. 2). For example, the orbital position information may comprise ephemerides reference epochs, square roots of semi-major axes, eccentricities, mean anomalies at reference epochs, arguments of perigees, inclinations at reference epochs, longitudes of ascending nodes, or some combination thereof for each of the one or more NTN devices. In some embodiments, the orbital position information may include an almanac portion of the ephemeris information that has a validity period of greater than one day. In some embodiments, the orbital position information may further include cell IDs and/or indications of frequencies implemented by cells corresponding to the almanac portion of the ephemeris information.

The procedure 900 may further include generating a message in 904. In particular, the base station may generate a message that includes the orbital position information for transmission to a UE. The orbital position information may be for one or more NTN devices (such as the NTN device 108 (FIG. 1)) within a network with the base station. The message may comprise an RRC message or a NAS message. In some embodiments, the RRC message may comprise a RRC reconfiguration message that includes the orbital position information. The RRC reconfiguration message may include an RRC IE, such as the RRC IE 300 (FIG. 3). In some embodiments, the NAS message may comprise a NAS configuration update command that includes the orbital position information. The NAS configuration update command may include the essential ephemeris information list 500 (FIG. 5) and/or the essential ephemeris information entry 600 (FIG. 6).

The procedure 900 may further include transmitting the message to a UE (such as the UE 106 (FIG. 1)). In particular, the base station may transmit the message to the UE via a NTN device (such as the NTN device 108 (FIG. 1)).

Figure 10:
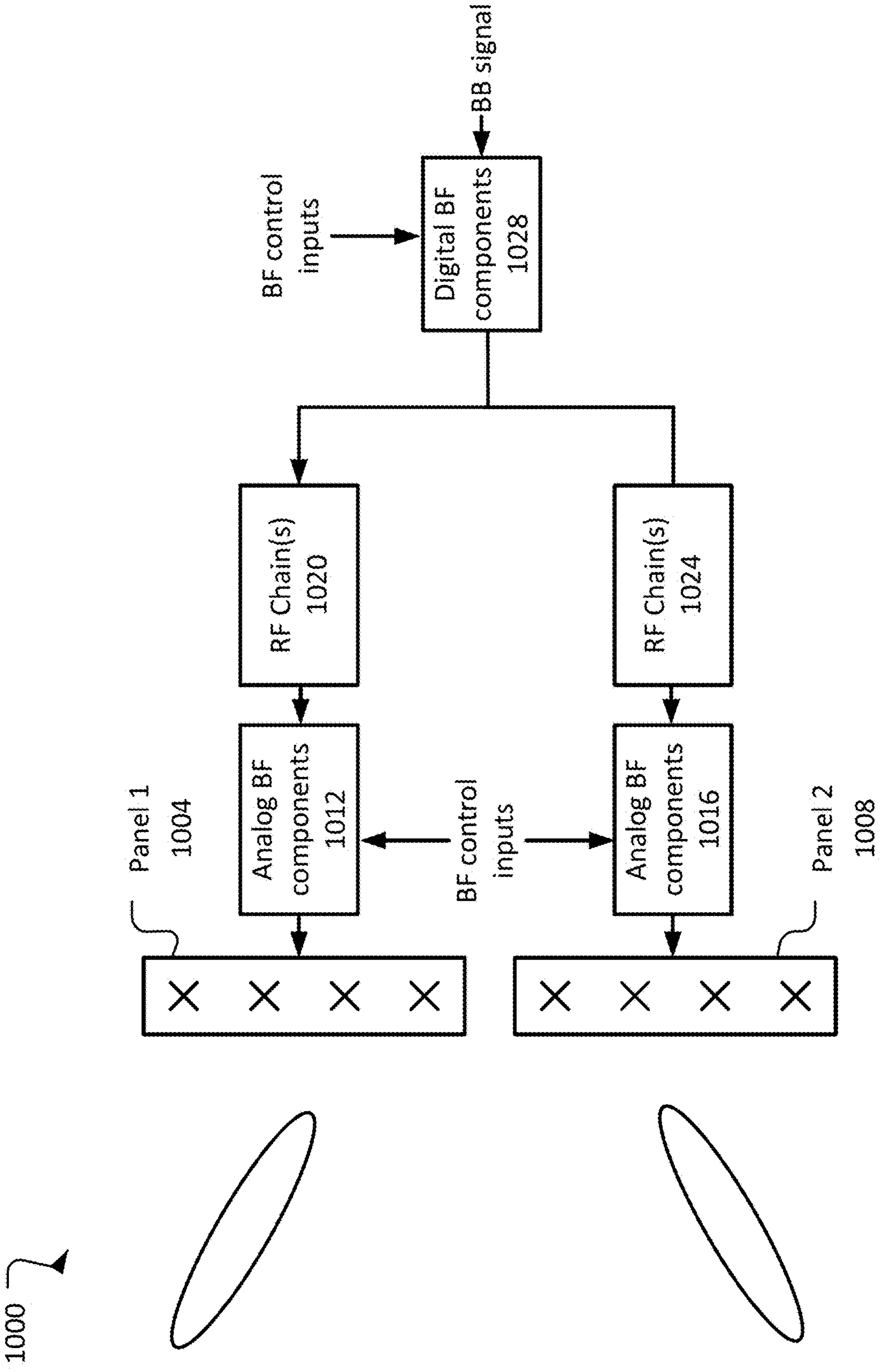
FIG. 10 illustrates example beamforming circuitry in accordance with some embodiments.

FIG. 10 illustrates example beamforming circuitry 1000 in accordance with some embodiments. The beamforming circuitry 1000 may include a first antenna panel, panel 1 1004, and a second antenna panel, panel 2 1008. Each antenna panel may include a number of antenna elements. Other embodiments may include other numbers of antenna panels.

Digital beamforming (BF) components 1028 may receive an input baseband (BB) signal from, for example, a baseband processor such as, for example, baseband processor 1104A of FIG. 11. The digital BF components 1028 may rely on complex weights to pre-code the BB signal and provide a beamformed BB signal to parallel radio frequency (RF) chains 1020/1024.

Each RF chain 1020/1024 may include a digital-to-analog converter to convert the BB signal into the analog domain; a mixer to mix the baseband signal to an RF signal; and a power amplifier to amplify the RF signal for transmission.

The RF signal may be provided to analog BF components 1012/1016, which may apply additionally beamforming by providing phase shifts in the analog domain. The RF signals may then be provided to antenna panels 1004/1008 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 11 illustrates an example UE 1100 in accordance with some embodiments. The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1100 may be a RedCap UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, phased array antennas, etc. The antenna 1126 may have one or more panels designed for specific frequency bands including bands in FR1 or FR2.

In some embodiments, the UE 1100 may include the beamforming circuitry 1000 (FIG. 11), where the beamforming circuitry 1000 may be utilized for communication with the UE 1100. In some embodiments, components of the UE 1100 and the beamforming circuitry may be shared. For example, the antennas 1126 of the UE may include the panel 1 1004 and the panel 2 1008 of the beamforming circuitry 1000.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

FIG. 12 illustrates an example gNB 1200 in accordance with some embodiments. The gNB 1200 may include processors 1204, RF interface circuitry 1208, CN interface circuitry 1212, memory/storage circuitry 1216, and antenna structure 1226.

The components of the gNB 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method for performing an operation by a user equipment (UE) based on orbital position information, comprising identifying orbital position information for one or more NTN devices that are to provide radio access network (RAN) service, the orbital position information restricted to an almanac portion of ephemeris information for the one or more NTN devices, determining, based on the orbital position information, positional information for an NTN device of the one or more NTN devices, and utilizing the positional information for the NTN device for cell selection, conditional handover, or measurement acquisition by the UE.

Example 2 may include the method of example 1, wherein the almanac portion of the ephemeris information comprises ephemerides reference epochs, square roots of semi-major axes, eccentricities, mean anomalies at reference epochs, arguments of perigees, inclinations at reference epochs, or longitudes of ascending nodes at a beginning of a week for each of the one or more NTN devices.

Example 3 may include the method of example 1, wherein the almanac portion of the ephemeris information includes information that has a validity period of greater than one day.

Example 4 may include the method of example 1, further comprising processing a radio resource control (RRC) message received from a base station to identify the orbital position information.

Example 5 may include the method of example 4, wherein the RRC message comprises an RRC reconfiguration message.

Example 6 may include the method of example 1, further comprising processing a non-access stratum (NAS) message received from a base station to identify the orbital position information.

Example 7 may include the method of example 6, wherein the NAS message comprises a configuration update command.

Example 8 may include the method of example 1, wherein utilizing the positional information includes establishing, based on the positional information, a connection with a cell via the NTN device.

Example 9 may include the method of example 1, wherein utilizing the positional information includes determining, based on the positional information, cells or frequencies that are unavailable to the UE, and performing measurements of a portion of cells or frequencies, wherein the portion of cells or frequencies excludes the cells or frequencies that are unavailable to the UE.

Example 10 may include a method for performing a user equipment (UE) operation based on orbital position information, comprising identifying, by a UE, orbital position information for one or more NTN devices received in a radio resource control (RRC) message or a non-access stratum (NAS) message from a base station, determining, by the UE based on the orbital position information, positional information for an NTN device of the one or more NTN devices, and utilizing, by the UE, the positional information for one or more UE operations.

Example 11 may include the method of example 10, wherein identifying the orbital position information includes identifying the orbital position information received in the RRC message, and wherein the RRC message comprises an RRC reconfiguration message.

Example 12 may include the method of example 10, wherein identifying the orbital position information includes identifying the orbital position information received in the NAS message, and wherein the NAS message comprises a configuration update command.

Example 13 may include the method of example 10, wherein the RRC message or the NAS message is routed from the base station through the NTN device of the one or more NTN devices to the UE.

Example 14 may include the method of example 10, wherein the orbital position information is restricted to an almanac portion of ephemeris information for the one or more NTN devices, and wherein the almanac portion comprises ephemerides reference epochs, square roots of semi-major axes, eccentricities, mean anomalies at reference epochs, arguments of perigees, inclinations at reference epochs, or longitudes of ascending nodes for each of the one or more NTN devices.

Example 15 may include the method of example 10, wherein utilizing the positional information for the one or more UE operations includes establishing, based on the positional information, a connection with a cell via the NTN device of the one or more NTN devices.

Example 16 may include the method of example 10, wherein utilizing the positional information for the one or more UE operations includes determining, based on the positional information, cells or frequencies that are unavailable to the UE, and performing measurements of a portion of cells or frequencies, wherein the portion of cells and frequencies excludes the cells or frequencies that are unavailable to the UE.

Example 17 may include a method for providing orbital position information to a user equipment (UE), comprising identifying, by a base station, the orbital position information for one or more NTN devices for serving UEs obtained from an NTN control center, the orbital position information being a portion of ephemeris information less than a whole of the ephemeris information for the one or more NTN devices, generating, by the base station, a message that includes the orbital position information for transmission to a UE, and transmitting, by the base station, the message to the UE.

Example 18 may include the method of example 17, wherein the orbital position information comprises ephemerides reference epochs, square roots of semi-major axes, eccentricities, mean anomalies at reference epochs, arguments of perigees, inclinations at reference epochs, and longitudes of ascending nodes for each of the one or more NTN devices.

Example 19 may include the method of example 17, wherein generating the message includes generating, by the base station, a radio resource control (RRC) reconfiguration message that includes the orbital position information.

Example 20 may include the method of example 17, wherein generating the message includes generating, by the base station, a non-access stratum (NAS) configuration update command that includes the orbital position information.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions stored thereon, wherein the instructions, when executed, cause processing circuitry to:

identify orbital position information for a non-terrestrial network (NTN) device that is to provide radio access network (RAN) service, the orbital position information received in an information element of a radio resource control (RRC) message, the orbital position information restricted to an almanac portion for the NTN device, wherein the almanac portion received in the information element comprises a semi-major axis parameter, an eccentricity parameter, an argument of perigee parameter, an inclination angle parameter, a mean anomaly parameter, and a longitude parameter for the NTN device;

identify frequency information, received with the orbital position information in the RRC message, for at least one cell of the NTN device;

identify, based at least in part on the frequency information, at least one frequency to perform measurements of at least one network element; and utilize positional information for the NTN device and results of the measurements of the at least one network element for cell selection, conditional handover, or measurement acquisition by a user equipment (UE), the positional information for the NTN device being based on the orbital position information.

2. The one or more non-transitory computer-readable media of claim 1, wherein the semi-major axis parameter comprises a square root of a semi-major axis indication, the eccentricity parameter comprises an eccentricity indication, the argument of perigee parameter comprises an argument of perigee indication, the inclination angle parameter comprises an inclination angle at a reference time indication, the mean anomaly parameter comprises a mean anomaly at the reference time indication, and the longitude parameter comprises a longitude of ascending node indication.

3. The one or more non-transitory computer-readable media of claim 1, wherein the almanac portion includes information that has a validity period of greater than one day.

4. The one or more non-transitory computer-readable media of claim 1, wherein the instructions, when executed, further cause the processing circuitry to process the RRC message received from a base station to identify the orbital position information.

5. The one or more non-transitory computer-readable media of claim 4, wherein the RRC message comprises an RRC reconfiguration message.

6. The one or more non-transitory computer-readable media of claim 1, wherein to utilize the positional information includes to establish, based on the positional information, a connection with a cell via the NTN device.

7. The one or more non-transitory computer-readable media of claim 1, wherein to utilize the positional information includes to:

determine, based on the positional information, frequencies that are unavailable to the UE; and perform measurements of a portion of frequencies, wherein the portion of frequencies excludes the frequencies that are unavailable to the UE.

8. An apparatus comprising:

processing circuitry to:

identify orbital position information for a non-terrestrial network (NTN) device received in an information element in a radio resource control (RRC) message from a base station, the orbital position information restricted to an almanac portion comprising a semi-major axis parameter, an eccentricity parameter, an argument of perigee parameter, an inclination angle parameter, a mean anomaly parameter, and a longitude parameter for the NTN device; and utilize positional information for a user equipment (UE) operation, the positional information based on the orbital position information and for the NTN device identify frequency information, received with the orbital position information in the RRC message, for at least one cell of the NTN device;

identify, based at least in part on the frequency information, at least one frequency to perform measurements of at least one network element; and interface circuitry coupled with the processing circuitry, the interface circuitry to receive the orbital position information.

9. The apparatus of claim 8, wherein the RRC message comprises an RRC reconfiguration message.

10. The apparatus of claim 8, wherein the RRC message is routed from the base station through the NTN device to the apparatus.

11. The apparatus of claim 8, wherein the semi-major axis parameter comprises a square root of a semi-major axis indication, the eccentricity parameter comprises an eccentricity indication, the argument of perigee parameter comprises an argument of perigee indication, the inclination angle parameter comprises an inclination angle at a reference time indication, the mean anomaly parameter comprises a mean anomaly at the reference time indication, and the longitude parameter comprises a longitude of ascending node indication.

12. The apparatus of claim 8, wherein to utilize the positional information for the UE operation includes to establish, based on the positional information, a connection with a cell via the NTN device.

13. The apparatus of claim 8, wherein to utilize the positional information for the UE operation includes to:

determine, based on the positional information, frequencies that are unavailable to the UE; and perform measurements of a portion of frequencies, wherein the portion of frequencies excludes the frequencies that are unavailable to the UE.

14. A method comprising:

identifying orbital position information for a non-terrestrial network (NTN) device, the orbital position information received in an information element in a radio resource control (RRC) message, wherein the orbital position information is restricted to an almanac portion comprising a semi-major axis parameter, an eccentricity parameter, an argument of perigee parameter, an inclination angle parameter, a mean anomaly parameter, and a longitude parameter for the NTN device;

identifying frequency information, received with the orbital position information in the RRC message, for at least one cell of the NTN device;

identifying, based at least in part on the frequency information, at least one frequency to perform measurements of at least one network element; and utilizing positional information for the NTN device and results of the measurements of the at least one network element for cell selection, conditional handover, or measurement acquisition, the positional information based on the orbital position information.

15. The method of claim 14, wherein the semi-major axis parameter comprises a square root of a semi-major axis indication, the eccentricity parameter comprises an eccentricity indication, the argument of perigee parameter comprises an argument of perigee indication, the inclination angle parameter comprises an inclination angle at a reference time indication, the mean anomaly parameter comprises a mean anomaly at the reference time indication, and the longitude parameter comprises a longitude of ascending node indication.

16. The method of claim 14, wherein utilizing the positional information includes establishing, based on the positional information, a connection with a cell via the NTN device.

17. The method of claim 14, wherein the RRC message includes multiple orbital position entries for multiple NTN devices, wherein the method further comprises:

identifying an indication of a number of the multiple orbital position entries in the RRC message, the multiple orbital position entries corresponding to the multiple NTN devices;

utilizing the multiple orbital position entries to determine a plurality of positional information for the multiple NTN devices; and utilizing the plurality of positional information for the multiple NTN devices for the cell selection, the conditional handover, or the measurement acquisition.

18. The method of claim 14, wherein the RRC message is a first RRC message, and wherein the method further comprises:

identifying additional orbital position information for additional NTN devices, the additional orbital position information received in a second RRC message, the additional orbital position information segmented from an entirety of position information for the cell selection, the conditional handover, or the measurement acquisition, the entirety of position information including the orbital position information for the NTN device; and utilizing the additional positional information for the additional NTN devices for the cell selection, the conditional handover, or the measurement acquisition, the additional positional information based on the additional orbital position information.

19. The method of claim 14, further comprising:

identifying, based at least in part on the frequency information, at least one unavailable frequency; and performing the measurements of the at least one network element, wherein the at least one unavailable frequency is excluded from the measurements.

* * * * *